(12) United States Patent
Yan

(10) Patent No.: US 8,572,510 B2
(45) Date of Patent: Oct. 29, 2013

(54) HANDLING MULTIPLE DYNAMICALLY-LINKED DROPDOWNS IN ONLINE APPLICATIONS

(75) Inventor: Nancy Yan, Santa Clara, CA (US)

(73) Assignee: SAP AG, Walldorf (DE)

( * ) Notice: Subject to any disclaimer, the term of this patent is extended or adjusted under 35 U.S.C. 154(b) by 1376 days.

(21) Appl. No.: 12/242,693

(22) Filed: Sep. 30, 2008

(65) Prior Publication Data

US 2010/0083183 A1    Apr. 1, 2010

(51) Int. Cl.
   *G06F 3/048*    (2013.01)

(52) U.S. Cl.
   USPC ............ 715/843; 715/711; 715/825; 715/854

(58) Field of Classification Search
   USPC .......................................................... 715/843
   See application file for complete search history.

(56) References Cited

U.S. PATENT DOCUMENTS

| | | | | |
|---|---|---|---|---|
| 5,546,576 A | * | 8/1996 | Cochrane et al. | 1/1 |
| 5,640,558 A | * | 6/1997 | Li | 717/116 |
| 7,194,695 B1 | * | 3/2007 | Racine et al. | 715/780 |
| 7,249,328 B1 | * | 7/2007 | Davis | 715/853 |
| 7,627,854 B2 | * | 12/2009 | Burner et al. | 717/115 |
| 7,840,600 B1 | * | 11/2010 | Bhatia | 707/793 |
| 7,844,587 B2 | * | 11/2010 | Blakeley et al. | 707/705 |
| 2003/0195802 A1 | * | 10/2003 | Hensen et al. | 705/14 |
| 2004/0158557 A1 | * | 8/2004 | Welcker et al. | 707/3 |
| 2005/0261891 A1 | * | 11/2005 | Chan et al. | 704/9 |
| 2005/0268244 A1 | * | 12/2005 | Vignet | 715/760 |
| 2006/0020904 A1 | * | 1/2006 | Aaltonen et al. | 715/850 |
| 2006/0089806 A1 | * | 4/2006 | Fitzsimmons et al. | 702/14 |
| 2006/0136309 A1 | * | 6/2006 | Horn et al. | 705/26 |
| 2006/0168530 A1 | * | 7/2006 | Muller et al. | 715/751 |
| 2006/0242606 A1 | * | 10/2006 | Lin | 715/855 |
| 2009/0013267 A1 | * | 1/2009 | Cudich et al. | 715/762 |
| 2010/0058164 A1 | * | 3/2010 | Best | 715/224 |
| 2010/0161512 A1 | * | 6/2010 | Tanpoco | 705/36 R |
| 2011/0004830 A1 | * | 1/2011 | Von Kaenel et al. | 715/751 |

* cited by examiner

*Primary Examiner* — Stephen Alvesteffer
(74) *Attorney, Agent, or Firm* — Blakely, Sokoloff, Taylor & Zafman, LLP

(57) ABSTRACT

Multiple dropdowns on a graphical user interface (GUI) are dynamically linked at runtime. The dropdowns are associated with inter-related attributes of an object displayed on the GUI. The content of each dropdown includes a list of values of an attribute and is entirely or partially hidden until the dropdown is selected. The list of values of each dropdown are dynamically generated and rendered at runtime, using stored data that links the attributes to their parent attributes. The stored data can be dynamically updated to reflect currently-available attribute values and the relationship of the attributes.

24 Claims, 6 Drawing Sheets

FIG. 3

| INDEX | FIELD NAME | LINKED FIELD NAME | VALUE TABLE | | | |
|---|---|---|---|---|---|---|
| 1 | CATEGORY | | Index | Value Key | Description | Linked Value Key |
| | | | 1 | 0001 | Pharmaceutical | |
| | | | 2 | 0002 | Information Technology | |
| 2 | SUBCATEGORY | CATEGORY | Index | Value Key | Description | Linked Value Key |
| | | | 1 | 1001 | Diabetes | 0001 |
| | | | 2 | 1002 | Anti-Infectious | 0001 |
| | | | 3 | 1003 | Hardware Configuration | 0002 |
| 3 | TECHNOLOGY_TYPE | CATEGORY | Index | Value Key | Description | Linked Value Key |
| | | | 1 | 3001 | Software | 0002 |
| | | | 2 | 3002 | Online Service | 0001 |
| | | | 3 | 3003 | Hardware | 0002 |

FIG. 4

HANDLING MULTIPLE DYNAMICALLY-LINKED DROPDOWNS IN ONLINE APPLICATIONS

FIELD OF THE INVENTION

The present invention relates generally to graphical user interface designs. More particularly, this invention relates to the management of linked attributes presented as dropdowns in online applications.

BACKGROUND

A graphical user interface (GUI) is a user interface that allows users to interact with a computing device by directly manipulating displayed GUI elements, such as graphical icons and visual indicators (e.g., buttons, tabs, etc.). One of the common GUI elements is a dropdown menu, or equivalently, a dropdown list or a dropdown. The content of a dropdown typically includes a list of values selectable by a user. In one scenario, a dropdown hides the display of its content until the dropdown is selected by a user. In some other scenarios, a dropdown displays a default values (which is one of the values in the list) before a user selects the dropdown, and displays the list of values when a user selects the dropdown. The use of dropdowns simplifies the task of data entry, because a user does not need to type the data but can select the data. This prevents potential user mistakes and data errors.

In some scenarios, the contents of one dropdown may be dependent on the selection of one or more other dropdowns. For example, a company may be spread over multiple geographical locations, and the divisions in one location may be different from the divisions in another location. The company's Web page may include a first dropdown that shows the different locations, and a second dropdown that shows the divisions. The content of the second dropdown is dependent on the selection of the first dropdown.

Currently, most applications build relationships among multiple dropdowns statically at design time. Generally, the relationship and the candidate values in the dropdowns are hard-coded. Adding new dropdowns, adding new linkages among dropdowns or altering relationships between linked dropdowns would necessitate extensive custom code and programming efforts.

BRIEF DESCRIPTION OF THE DRAWINGS

Embodiments are illustrated by way of example and not by way of limitation in the figures of the accompanying drawings, in which like references indicate similar elements. It should be noted that references to "an" or "one" embodiment in this disclosure are not necessarily to the same embodiment, and such references mean at least one.

FIG. 3 illustrates a GUI that displays the dynamic linked attributes of another object.

FIG. 4 illustrates a data structure that stores values and relationships of the attributes.

DETAILED DESCRIPTION

A method and system for handling dynamically-linked dropdowns is described herein. The dropdowns are associated with inter-related attributes of an object displayed on a graphical user interface (GUI). The content of each dropdown includes a value list of an attribute and is, at least in part, hidden until the dropdown is selected by a user. The value list of each dropdown is dynamically generated and rendered at runtime, using stored data that links the attributes to their parent attributes. The stored data can be dynamically updated to reflect currently-available attribute values and the relationship of the attributes.

In one scenario, an application (e.g., an online application such as a Web application) consists of a set of objects, each object defined by multiple attributes. To conduct a transaction through the application, a user may be requested to enter a value to the required attribute associated with the object. Some GUIs provide dropdown menus (also referred to as dropdowns) for the user to assign the attribute values. The use of dropdowns facilitates the data input process and prevents unintended typographical errors that could be made by the user. According to embodiments of the present invention, a GUI presents multiple dropdowns, each dropdown associated with one of a plurality of inter-related attributes. The contents of the dropdowns are dynamically assembled at runtime. The dynamic feature of the dropdowns allows efficient updates to the dropdowns without incurring significant re-programming of the GUI.

It is understood that the term "dropdown" herein refers to a selection menu, which is displayed as a GUI element having a fully or partially hidden content until the GUI element is selected. Before the selection of the GUI element, a blank space or a default value may be displayed. The selection of the GUI element may be performed by a cursor selecting or clicking a box, an arrow, an icon, or other textual or graphical symbols associated with the GUI element. In alternative embodiments, the content the GUI element may be displayed above, on a side, or in other positions relative to the GUI element upon selection of the GUI element.

Figure 1:
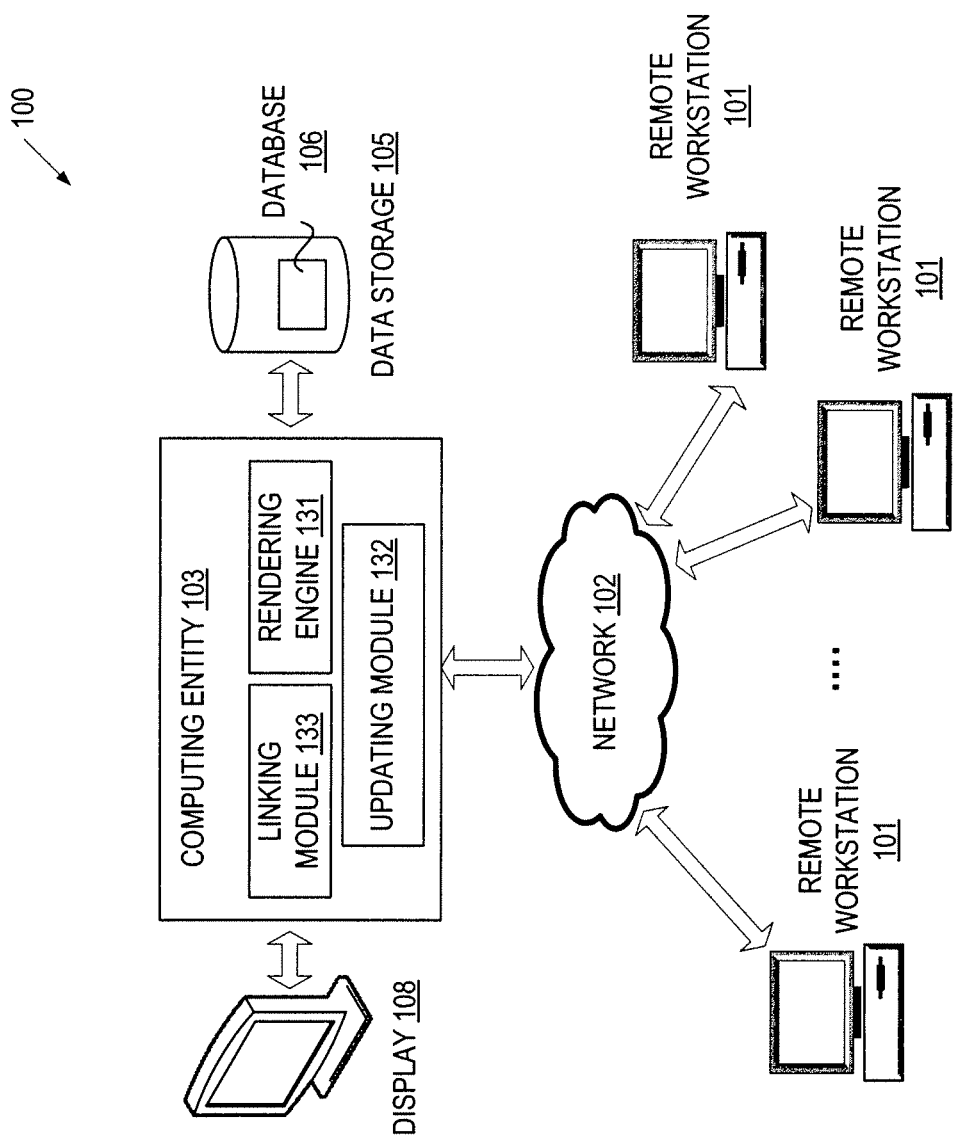
FIG. 1 illustrates a network architecture in which embodiments of the present invention may be implemented.

FIG. 1 shows an embodiment of a network environment in which a system 100 may operate. System 100 includes a plurality of remote workstations 101 and a computing entity 103 coupled by a network 102, which may be a public network (e.g., the Internet) or a private network (e.g., an Ethernet or a Local Area Network (LAN)). Computing entity 103 and remote workstations 101 may be, for example, servers, personal computers (PCs), mobile phones, palm-sized computing devices, personal digital assistants (PDAs), or the like. Each of computing entity 103 and remote workstations 101 is coupled to a display (e.g., display 108) for presenting a GUI to a user.

In one embodiment, computing entity 103 is locally coupled to data storage 105 in which a database 106 is stored. Data storage 105 may include one or more database systems. Data storage 105 may include one or more storage devices (e.g., read only memory ("ROM"), random access memory ("RAM"), magnetic disk storage media, optical storage media, flash memory devices, etc.), that are local and/or remote from computing device 103. In one embodiment, database 106 may store one or more data structures that contain information of the attributes associated with an object managed by computing entity 103. The object and its attributes can be displayed via a GUI on display 108 and/or any of the displays of remote workstations 101. In one embodiment, computing entity 103 is a server and remote workstations 101 are clients.

In the embodiment of FIG. 1, computing entity 103 includes a rendering engine 131, an updating module 132 and a linking module 133. Linking module 133 dynamically links values in the data structures for rendering engine 131 to display, rendering engine 131 renders textual and graphical information on display 108 and/or any of the displays of remote workstations 101, and updating module 132 updates the data structures stored in database 106. The functionality of linking module 133, rendering engine 131 and updating module 132 will be described in greater detail with reference to FIGS. 5 and 6.

Figure 2:
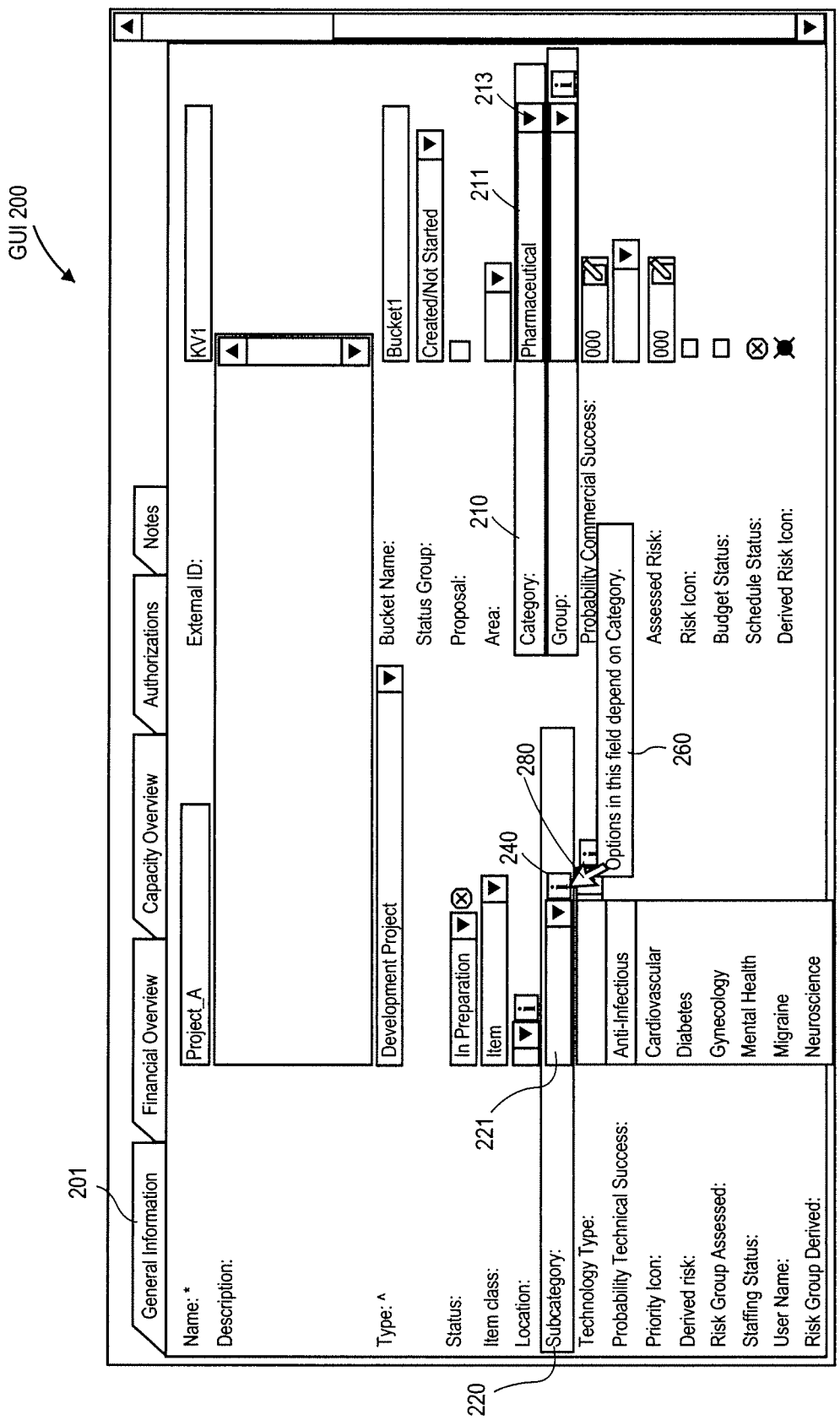
FIG. 2 illustrates a graphical user interface (GUI) that displays the dynamic linked attributes of an object.

FIG. 2 illustrates an example of a GUI 200 that may be shown on display 108 and/or any of the displays of remote workstations 101. In this embodiment, GUI 200 allows a user to determine attribute values of an object "Project_A." Under a tab "general information" 201, GUI 200 presents a plurality of attributes of the object, each attribute associated with one or more of a text box (for displaying or receiving a name, a description, etc.), a dropdown (for a user to choose a value from a list of candidate values), a graphical icon (for a user to select, toggle, or otherwise select), and other graphical or textual user interface elements. A dropdown contains a list of values, which are hidden, entirely or partially, until the dropdown is selected by a user. In this embodiment, a user may select a dropdown (e.g., a dropdown 211) by clicking an arrow 213 next to dropdown 211. Other selection mechanisms may exist.

In one embodiment, some attributes (referred to as children attributes) are dependent on one or more other attributes (referred to as parent attributes). That is, the content of the dropdown associated with a child attribute is dependent on the chosen value of its parent attribute. In this example, an attribute "Category" 210 is the parent attribute of an attribute "Subcategory" 220. Category 210 and Subcategory 220 are associated with dropdowns 211 and 221, respectively. If a user chooses "pharmaceutical" from dropdown 211 as the chosen value of Category 210, the displayed content of dropdown 221 for Subcategory 220 will include a list of values that are related to the pharmaceutical category, such as anti-infectious, cardiovascular, diabetes, gynecology, mental health, etc. However, if the user chooses a different value for Category 210, the displayed content of dropdown 221 (for Subcategory 220) will change to a list of values that correspond to the chosen value of Category 210. As will be described in greater detail below, the displayed content of a dropdown is determined dynamically at runtime.

GUI 200 allows a user to obtain dependency information of the attributes. In one embodiment, GUI 200 displays information icons adjacent to the dropdowns associated with dependent attributes. An attribute is a dependent attribute if it is a child attribute of one or more other attributes. For example, an information icon 240 is shown as a graphical symbol "i" next to dropdown 221, which is associated with a dependent attribute (Subcategory 220). An information icon shows the dependency information of its associated attribute when a user places a cursor (e.g., a cursor 280) on or near (e.g., within a predetermined vicinity such within 10 or fewer pixels) the information icon. Once the cursor is placed in such a position, a text box (also referred to as a tooltip text) appears on GUI 200 to display the name of the parent attribute or other dependency information of the associated attribute. In the example of FIG. 2, tooltip text 260 appears when a cursor is placed adjacent to information icon 240. Tooltip text 260 displays "Options in this field depend on Category," which informs a user of the parent attribute's name. In one embodiment, an information icon is displayed next to each child attribute. The display of the information icons is determined dynamically at runtime based on runtime defined dependency relationship among the attributes. Further, the content of the tooltip text associated with an information icon is also determined dynamically at runtime. Thus, if a system administrator updates the relationship or names of the attributes, the appearance of information icon 240 and the content of tooltip text 260 will be dynamically updated without re-programming the code for displaying GUI 200. A data structure that supports the dynamic update will be described in greater detail with reference to FIG. 4.

Figure 3:
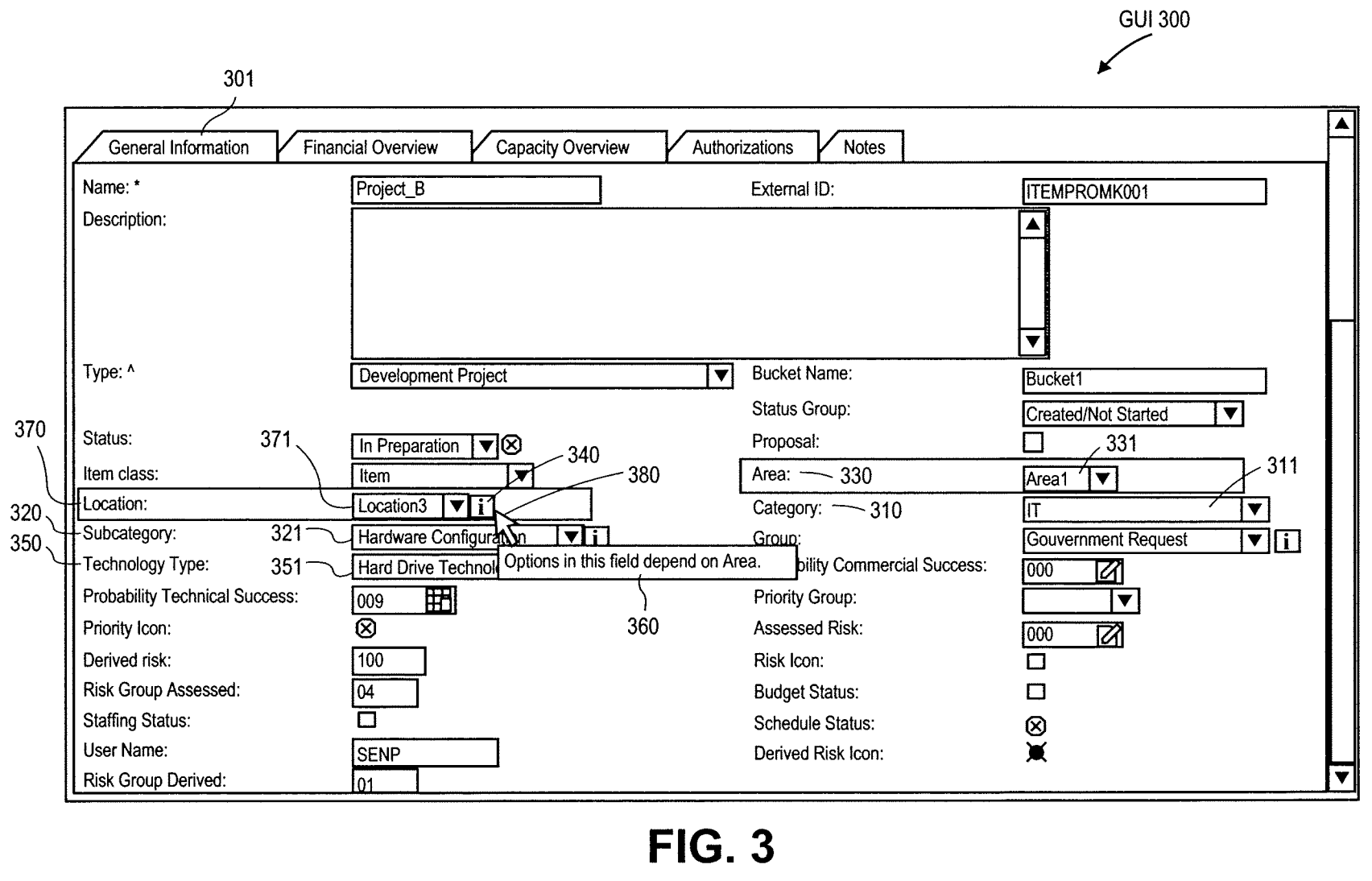

FIG. 3 illustrates another example of a GUI 300 that may be shown on display 108 and/or any of the displays of remote workstations 101. In this embodiment, GUI 300 presents general information 301 of an object "Project_B," which is defined by a plurality of attributes, including a Category 310 and a Subcategory 320. Category 310 and Subcategory 320 are associated with dropdowns 311 and 321, respectively. If a user chooses the value "IT" (Information Technology) from dropdown 311 as the chosen value of Category 310, the displayed content of dropdown 321 (for Subcategory 320) will include a list of values (e.g., hardware configuration, software configuration, etc.) that are related to the IT category.

A parent attribute can have multiple children attributes. In the example of FIG. 3, Category 310 is the parent attribute of Subcategory 320 and another attribute "Technology Type" 350. Thus, the chosen value of Category 310 affects not only the displayed content of dropdown 321 (for Subcategory 320), but also the displayed content of a dropdown 351 for Technology Type 350 (e.g., software, hardware, hard drive technology, etc.).

FIG. 3 also shows that an attribute "Area" 330 is the parent attribute of an attribute "Location" 370. Thus, the displayed content of a dropdown 371 associated with Location 370 depends on the chosen value in a dropdown 331 associated with Area 330. FIG. 3 further shows that, when a cursor 380 is placed next to an information icon 340 adjacent to dropdown 321, a tooltip text 360 appears on GUI 300 to display the name of the parent attribute or other dependency information of the associated attribute, such as "Options in this field depend on Area." As mentioned previously with reference to FIG. 2 and described below with reference to FIG. 4, the content of text box 360 is assembled dynamically at runtime.

According to one embodiment of the invention, the content of a dropdown for a child attribute is assembled at runtime, after the value of the parent attribute has been chosen. The dropdown for a child attribute shows a list of valid values based on the chosen value of its parent attribute. The content of the dropdown reflects the currently-available attribute values in database, which may be added, deleted, or removed at runtime.

FIG. 4 shows an embodiment of a database structure in a table format (e.g., an attribute table 400), which enables the dynamic assembly of information as described above. Attribute table 400 stores the values of the attributes of an object and the relationship among the attributes. Attribute table 400 can be updated to add, remove, and change attribute names, attribute values, and relationship among the attributes. Attribute table 400 can be used to dynamically assemble dependency information and values of parent and children attributes for display on a GUI. In one embodiment, attribute table 400 is stored in database 106 and accessible by computing entity 103 of FIG. 1. It is understood that data in the attribute table 400 may also be organized as a list, an array, or other data formats that may vary from a table.

In the embodiment of FIG. 4, attribute table 400 includes an index column 401, a field name column 402, a linked field name column 403, and a value table column 404. Each row of attribute table 400 contains data relating to an attribute. For each attribute, index column 401 contains an index value, field name column 402 contains the name of the attribute, and linked field name column 403 contains the name of its parent attribute, and value table column 404 contains the values of the attribute, as well as value keys, descriptions, and linked value keys for the values. A value key is a unique identifier for an attribute value. If two attribute values have the same name but belong to different attributes, two different value keys will be assigned to the attribute values. A description includes the name of an attribute value, which is not necessarily unique. A linked value key uniquely identifies the parent attribute value on which a child attribute value depends. For example, linked value key 0001 (which identifies "pharmaceutical") for value key 1001 (which identifies "diabetes") indicates that "pharmaceutical" is the parent attribute value for "diabetes."

In one embodiment, information in attribute table 400 is retrieved by linking module 133 of computing entity 103 at runtime to generate the displayed content of dropdowns and the tooltip texts associated with the information icons. Linking module 133 uses the value keys associated with a chosen value of a parent attribute and the linked value keys associated with a child attribute to determine the displayed values of the child attribute. As the information is determined and generated at runtime, any runtime changes to the relationship of the attributes will be shown in the displayed contents of the dropdowns dynamically.

In one embodiment, attribute table 400 is updated by updating module 132 of computing entity 103 to reflect the currently-available values of the attributes. For example, an attribute value may be unavailable due to a backorder in the inventory or a restructuring of an organization. A new attribute value may be added by system administrator as it becomes available. Attribute table 400 may also be updated to reflect a change of relationship among the attributes. For example, the attribute "Technology Type" 350 may be updated to depend on the attribute "Subcategory" 320 instead of "Category" 310. When updating attribute table 400, updating module 132 examines and updates the value keys and linked value keys of the updated attributes, as well as the children attributes of these updated attributes. The updating operations can be performed at runtime in parallel with data retrieval operations, as long as read and write operations are not performed on the same data entry at the same time.

In some embodiments, each attribute value in attribute table 400 is associated with a flag (not shown) to indicate whether the corresponding value is valid to be displayed in dropdowns. For example, updating module 132 may reset the flag for the value "Hard Drive" to indicate that hard drives are out of stock or otherwise unavailable. The flag can be set once its associated value becomes available and, therefore, valid. A scheduled process (e.g., an inventory management process) may be run in the background or a function module can be called during data retrieval to determine the validity of these values continuously or periodically. The determined availability can be used by updating module 132 to update these flags. The use of the flags allows a selected dropdown to display only those values that are currently available.

Figure 5:
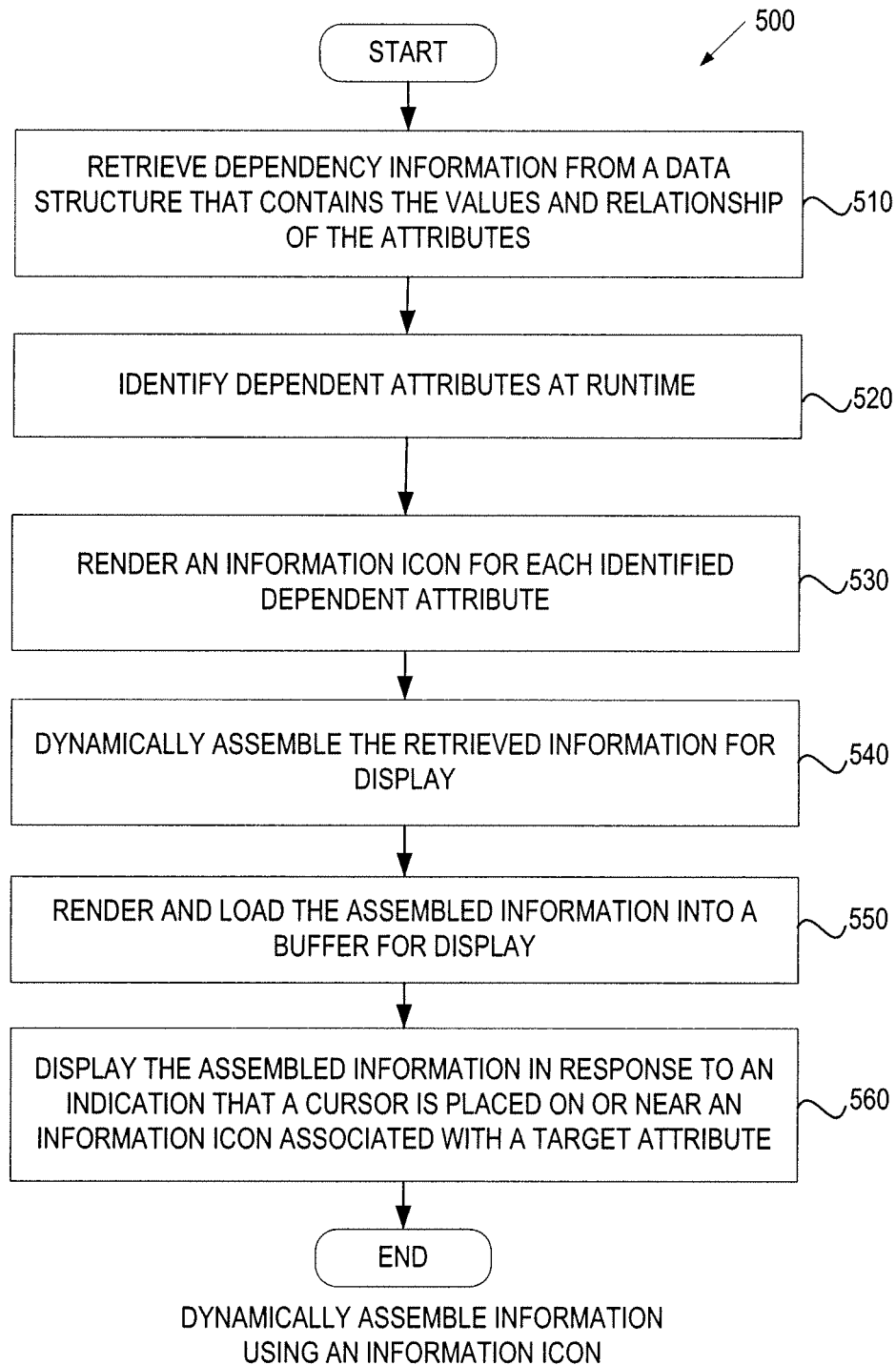
FIG. 5 illustrates a flow diagram of a method for dynamically assembling dependency information according to one embodiment of the present invention.

FIG. 5 illustrates a flow diagram of one embodiment of a method 500 for dynamically assembling the information of a target attribute at runtime. Method 500 may be performed by processing logic that may comprise hardware (e.g., circuitry, dedicated logic, programmable logic, microcode, etc.), software (such as instructions stored on a computer-readable medium executable by a processing system), or a combination thereof. In one embodiment, method 500 is performed by computing entity 103 of FIG. 1.

Referring to FIG. 5, method 500 starts with an online application at a client side (e.g., a web browser such as Microsoft Internet Explorer) being invoked by a user, thereby commencing the runtime of the online application. At block 510, linking module 133 of computing entity 103 retrieves dependency information from a data structure (e.g., attribute table 400 of FIG. 4) from a database. The data structure stores the name and other information of parent attributes, as well as values and value keys that link attribute values to their parent attribute values. In the example of attribute table 400 of FIG. 4, linking module 133 may retrieve the name of the parent attribute of a target attribute from linked field name 402 in the row of the target attribute. At block 520, computing entity 103 identifies, at runtime, dependent attributes of a displayed object. In one embodiment, dependent attributes can be identified at runtime by linking module 133 examining attribute table 400 in database 106. For example, if linked field name 403 for an attribute contains a value for a parent attribute name, the attribute can be determined as a dependent attribute. At block 530, rendering engine 131 of computing entity 103 renders an information icon for each of the identified dependent attributes on a GUI (e.g., on display 108 coupled to computing entity 103 and/or any of the displays of remote workstations 101). At block 540, linking module 133 dynamically assembles the retrieved information. In some embodiments, such as the examples shown in FIGS. 2 and 3, the retrieved information may be assembled with other data (e.g., text or graphics) for display. For example, the retrieved information (e.g., the name of the parent attribute "Category") may be assembled with a text string "Options in this field depend on ($Parent_Name)" to show "Options in this field depend on Category."

Proceeding to block 550, rendering engine 131 loads the assembled information into a buffer for display. The buffer stores rendered data, which may be displayed or expected to be displayed. The buffer stores the assembled information associated with all of the displayed information icons. For example, the buffer may be a client buffer used by a Web application (e.g., a web browser). A client buffer, such as a buffer in a Web browser, has a lifecycle that goes with a user session. Alternatively, the buffer may be a server buffer that resides on a server and is globally available to all users. A client buffer is usually in sync with the server buffer. However, if a system administrator adds a new attribute while the user is in the middle of a user session, the new attribute will not show in the current client buffer (but will show in the server buffer). The new attribute will show in the client buffer when a new user session starts.

In one embodiment, the assembled information associated with an information icon is displayed only when a cursor is placed on or near (e.g., within a predetermined vicinity) an information icon. The storage of the assembled information in the buffer eliminates the interaction between client side of an online application (e.g., a Web browser) and the backend server (e.g., rendering engine 131) to improve performance. Thus, it is not necessary to render a tooltip text every time a cursor is placed on or near an information icon. At block 560, the GUI receives an indication that a cursor is placed on or near an information icon associated with a target attribute. The assembled information associated with the information icon is shown on display 108 and/or any of the displays of remote workstations 101 in response to the placement of the cursor.

Figure 6:
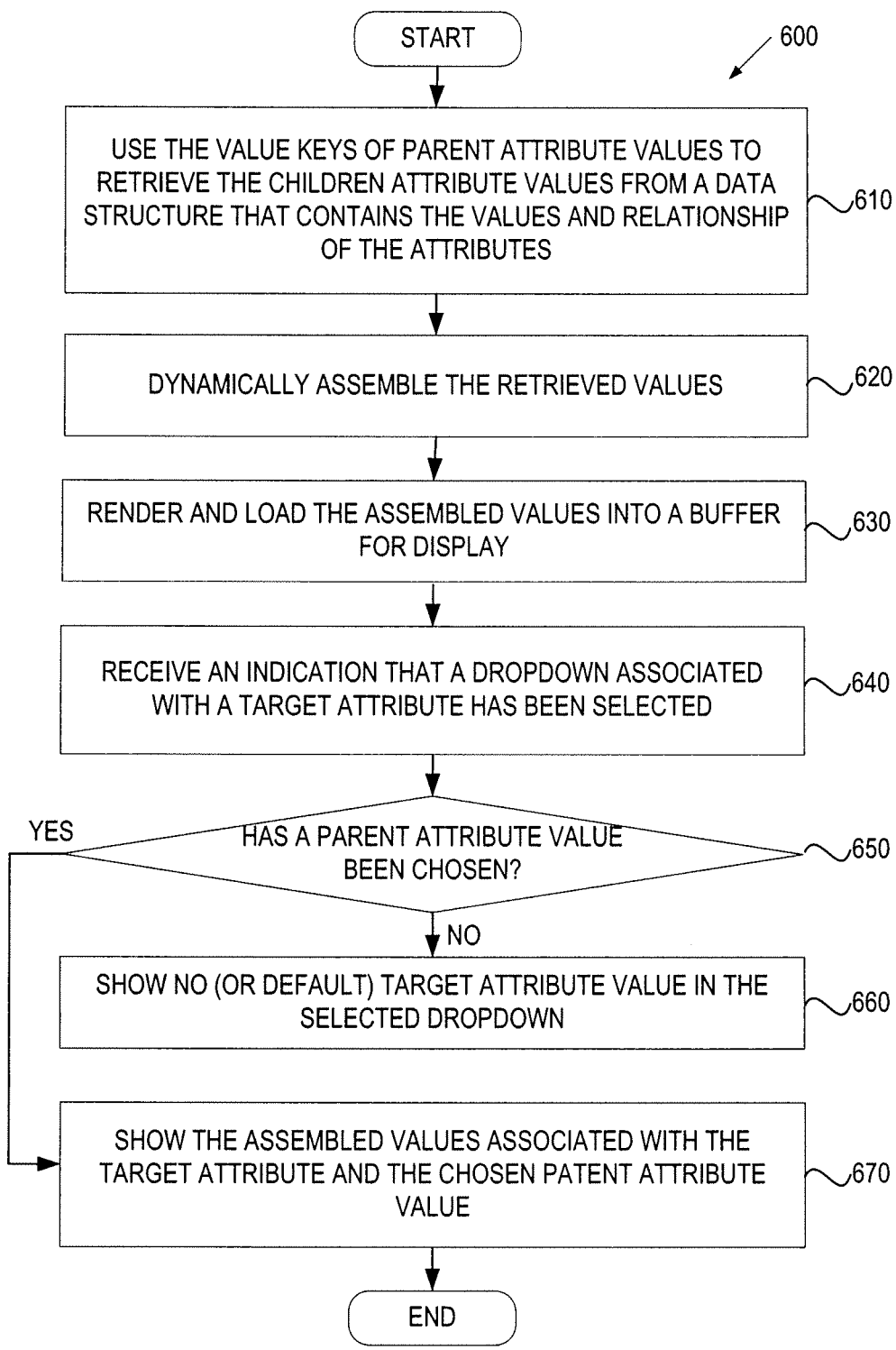
FIG. 6 illustrates a flow diagram of a method for dynamically linking attribute values according to one embodiment of the present invention.

FIG. 6 illustrates a flow diagram of one embodiment of a method 600 for dynamically assembling the information of a target attribute at runtime. Method 600 may be performed by processing logic that may comprise hardware (e.g., circuitry, dedicated logic, programmable logic, microcode, etc.), software (such as instructions stored on a computer-readable medium executable by a processing system), or a combination thereof. In one embodiment, method 600 is performed by computing entity 103 of FIG. 1.

Referring to FIG. 6, method 600 starts with an online application at a client side (e.g, a web browser such as Microsoft Internet Explorer) being invoked by a user, thereby commencing the runtime of the online application. At block 610, linking module 133 retrieves the children attribute values that are linked to their respective parent attribute values, using linked value keys in a data structure (e.g., attribute table 400 of FIG. 4) stored in database 106. In some embodiments, linking module 133 may retrieve only those attribute values that are currently valid (e.g., by checking the flags associated with each value). At block 620, linking module 133 dynamically assembles the retrieved values, and, at block 630, rendering engine 131 renders the assembled values and loads the rendered and assembled values into a buffer (e.g., a client buffer). At block 640, GUI on display 108 and/or any of the displays of remote workstations 101 receives an indication that a dropdown associated with a target attribute is selected. In one embodiment, the dropdown may be selected by a cursor selecting (e.g., pressing or clicking) an arrow or other symbols adjacent to the dropdown. At block 650, linking module 133 determines whether a value of the target attribute's parent (the parent attribute) has been chosen. If a value of the parent attribute has not been chosen, at block 660, the dropdown will not respond to the user selection; that is, the dropdown will not show any target attribute values, or alternatively, show a predetermined default target attribute value. If a value of the parent attribute has been chosen, at block 670, the assembled and rendered values (which are associated with the target attribute and the chosen parent attribute value) in the client buffer will be shown in the selected dropdown.

In the examples of FIGS. 5 and 6, it is assumed that the target attribute has a parent attribute. If the target attribute has no parent, it is understood that an information icon associated with the target attribute will not be displayed, and all of the valid target attribute values will be displayed in the selected dropdown associated with the target attribute. If the target attribute has more than one parent attribute, it is understood that information of all of its parent attributes can be displayed in a tooltip text associated with the target attribute, and that the valid target attribute values dependent on the chosen values of the parent attributes will be displayed in the activated dropdown.

In some scenarios, a parent attribute value may be changed after a value of its child attribute is chosen. The change may be caused by a user unselecting the chosen parent attribute value, or selecting a different value for the parent attribute. In response to the change, rendering engine 131 may refresh the chosen value of the child attribute on display 108 and/or any of the displays of remote workstations 101, by blanking or wiping out the displayed chosen value of the child attribute to ensure data integrity. The refresh operation prevents inconsistent attribute values from being displayed. After the refresh operation, a user may choose a target attribute value based on the new parent attribute value using method 600 of FIG. 6.

An embodiment of the invention may be a machine-readable medium having stored thereon instructions which cause a programmable processor to perform operations as described above. In other embodiments, the operations might be performed by specific hardware components that contain hard-wired logic. Those operations might alternatively be performed by any combination of programmed computer components and custom hardware components.

A machine-readable medium may include any mechanism for storing information in a form readable by a machine (e.g., a computer), including but not limited to Compact Disc Read-Only Memory (CD-ROM), Read-Only Memory (ROM), Random Access Memory (RAM), and Erasable Programmable Read-Only Memory (EPROM).

The applications of the present invention have been described largely by reference to specific examples and in terms of particular allocations of functionality to certain hardware and/or software components. However, those of skill in the art will recognize that the dynamic linking of the multiple dropdowns can also be made by software and hardware that distribute the functions of embodiments of this invention differently than herein described. Such variations and implementations are understood to be made without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
   dynamically assembling, by a computer system and after a client application is invoked, dependency information for display at runtime using stored data that links a plurality of inter-related attributes of an object;
   displaying the attributes on a display, the attributes including a target attribute associated with a dropdown, the content of which includes values of the target attribute and the content is entirely or partially hidden until the dropdown is selected;
   in response to an indication that the dropdown associated with the target attribute is selected, displaying the content of the dropdown associated with the target attribute using the dependency information that was dynamically assembled;
   displaying adjacent to the dropdown associated with the target attribute an information icon that is selected to represent the dependency information, wherein the information icon represents that the target attribute is dependent on a parent attribute of the plurality of inter-related attributes; and
   displaying, in response to placement of a cursor in a predetermined vicinity over the information icon, the information, including an identifier of the parent attribute in a tooltip text.

2. The method of claim 1, further comprising:
   dynamically assembling, after a client application is invoked, the information relating to the parent attribute of the target attribute for display at runtime.

3. The method of claim 2, wherein dynamically assembling information further comprises:
   loading the information into a client buffer for the client application before the placement of the cursor is detected; and
   displaying a name of the parent attribute in the tooltip text in response to the placement of the cursor.

4. The method of claim 2, wherein dynamically assembling dependency information further comprises:
   dynamically linking, at runtime, valid values of the target attribute based on parent attribute values; and
   rendering the valid values in the dropdown associated with the target attribute for display.

5. The method of claim 2, wherein dynamically assembling dependency information comprises:
   identifying a value key in the stored data, the value key uniquely identifying a chosen value of the parent attribute; and
   using the value key to identify available values of the target attribute for display.

6. The computer-implemented method of claim 2, wherein the predetermined vicinity includes the information icon.

7. The method of claim 1 further comprising:
   blanking out a chosen value of the target attribute on the display in response to a change of a chosen value of the parent attribute.

8. The method of claim 1, further comprising:
   maintaining the stored data in a data structure that includes a field containing a table of values for each of the attributes, each of the values for a given attribute associated with a unique value key and a linked value key, the linked value key uniquely identifying a value key associated with a respective parent attribute of the given attribute.

9. The method of claim 1, further comprising:
   identifying, at runtime, dependent attributes of the inter-related attributes;
   displaying a respective information icon associated with each of the dependent attributes on the display; and
   rendering, on the display, the information relating to a respective parent attribute of a selected dependent attribute when a cursor is placed over the respective information icon associated with the selected dependent attribute.

10. The computer-implemented method of claim 1 further comprising:
    setting a value of the target attribute, where a value of the target attribute does not equal a default value, to the default value in the dropdown in response to a change in a selection of one of the values of the parent attribute.

11. A system comprising:
    a display to display a user interface that shows a plurality of inter-related attributes of an object, each of the attributes associated with a dropdown, the content of which includes values of the attribute and is entirely or partially hidden until the dropdown is selected; and
    a computing entity coupled to the display, the computing entity including a processor to execute:
       a linking module to dynamically, after a client application is invoked, assemble dependency information for display at runtime with use of stored data that links the attributes, including a target attribute and a parent attribute; and
       a rendering engine coupled to the linking module to render the dependency information and load the information into a buffer associated with the client application for display and to render an indicator proximate to the dropdown associated with the target attribute in the user interface representing that the target attribute is dependent on the parent attribute, the rendering engine to render the dependency information, including an identifier of the parent attribute, for display in the user interface in a tooltip text in response to placement of a cursor in a predetermined vicinity over the indicator.

12. The system of claim 11, wherein the computing entity further comprises:
    an updating module, coupled to the rendering engine, to update the stored data to reflect current relationship among the attributes and available values of the attributes.

13. The system of claim 12, wherein the updating module is further to set a value of the target attribute, where a value of the target attribute does not equal a default value, to the default value in the dropdown associated with the target attribute in response to a change in a selection of one of the values of the parent attribute.

14. The system of claim 11, further comprising:
    a plurality of remote computing entities coupled to the computing entity via a network, each of the remote computing entities to display the information dynamically assembled by the linking module of the computing entity.

15. The system of claim 11, further comprising:
    data storage coupled to the computing entity to maintain the stored data in a data structure that includes a field containing a table of values for each of the attributes, each of the values for a given attribute associated with a unique value key and a linked value key, the linked value key to uniquely identify a value key associated with a parent attribute of the given attribute.

16. The system of claim 11, wherein the content of the dropdown associated with the target attribute depends on a chosen parent attribute value of the target attribute.

17. The system of claim 11, wherein the content of the dropdown associated with the target attribute depends on whether a target attribute value is currently available.

18. The system of claim 11, wherein the dependency information includes a name of the parent attribute for the target attribute.

19. The system of claim 11, wherein the rendering engine is further to render the dependency information of the target attribute for display in the user interface in response to a user interacting with the indicator.

20. A non-transitory computer-readable storage medium including instructions that, when executed by a computer system, cause the computer system to perform a method comprising:
    dynamically assembling, by the computer system and after a client application is invoked, dependency information for display at runtime using stored data that links a plurality of inter-related attributes of an object;
    displaying the attributes on a display, the attributes including a target attribute associated with a dropdown, the content of which includes values of the attribute and is entirely or partially hidden until the dropdown is selected;
    in response to an indication that the dropdown associated with the target attribute is selected, displaying the content of the dropdown associated with the target attribute using the dependency information that was dynamically assembled;
    displaying adjacent to the dropdown associated with the target attribute an information icon that is selected to represent the dependency information, wherein the information icon is selected to represent that the target attribute is dependent on a parent attribute of the plurality of inter-related attributes; and
    displaying, in response to placement of a cursor in a predetermined vicinity over the information icon, the information, including an identifier of the parent attribute in a tooltip text.

21. The non-transitory computer-readable storage medium of claim 20, wherein the method further comprises:
    dynamically assembling, after the client application is invoked, the information relating to the parent attribute of the target attribute for display at runtime wherein the information includes a name of the parent attribute; and loading the information into a client buffer for the client application before the placement of the cursor is detected.

22. The non-transitory computer-readable storage medium of claim 21, wherein dynamically assembling dependency information further comprises:
   dynamically linking, at runtime, valid values of the target attribute based on parent attribute values; and
   rendering the valid values in the dropdown associated with the target attribute for display.

23. The non-transitory computer-readable storage medium of claim 21, wherein dynamically assembling the information comprises:
   identifying a value key in the stored data, the value key uniquely identifying a chosen value of the parent attribute; and
   using the value key to identify available values of the target attribute for display.

24. The non-transitory computer-readable storage medium of claim 20, further comprising:
   blanking out a chosen value of the target attribute on the display in response to a change of a chosen value of the parent attribute.

* * * * *